United States Patent [19]

Robbins

[11] Patent Number: 4,628,358
[45] Date of Patent: Dec. 9, 1986

[54] TELEVISION SIGNAL ENCRYPTION SYSTEM WITH PROTECTED AUDIO

[75] Inventor: Clyde N. Robbins, Fort Washington, Pa.

[73] Assignee: General Instrument Corporation, New York, N.Y.

[21] Appl. No.: 503,250

[22] Filed: Jun. 10, 1983

[51] Int. Cl.⁴ .......................................... H04N 7/167
[52] U.S. Cl. ...................................... 358/121; 358/124
[58] Field of Search ............... 358/114, 120, 121, 124, 358/123, 122; 179/1.5 R, 1.5 S

[56] References Cited

U.S. PATENT DOCUMENTS

| | | | |
|---|---|---|---|
| 2,953,643 | 9/1960 | Koenig, Jr. | 179/1.5 S |
| 3,610,828 | 10/1971 | Girard et al. | 179/1.5 S |
| 3,824,332 | 7/1974 | Horowitz | 358/124 |
| 4,318,126 | 3/1982 | Sassler | 358/141 |
| 4,396,947 | 8/1983 | Cheung | 358/120 |

*Primary Examiner*—Stephen C. Buczinski
*Assistant Examiner*—Melissa Koltak
*Attorney, Agent, or Firm*—Hopgood, Calimafde, Kalil, Blaustein & Judlowe

[57] ABSTRACT

An encrypted video distribution system includes a signal-originating head end for scrambling the audio portion of outgoing television program-bearing signals. In particular, the audio content of a television program alternately reverses polarity under control of a keyed pseudo random generator. At each authorized subscriber location, a pseudo random generator is included in receiver descrambling circuitry and operates in a sequence identical to the like circuit at the head end to restore the polarity-inverted audio signal, thereby permitting reception and presentation of intelligible audio subject matter.

In accordance with another aspect of the present invention, the video information present during selected lines is inverted about a predetermined inversion level and restored at equipped, authorized subscriber stations also under control of the pseudo random generators.

12 Claims, 10 Drawing Figures

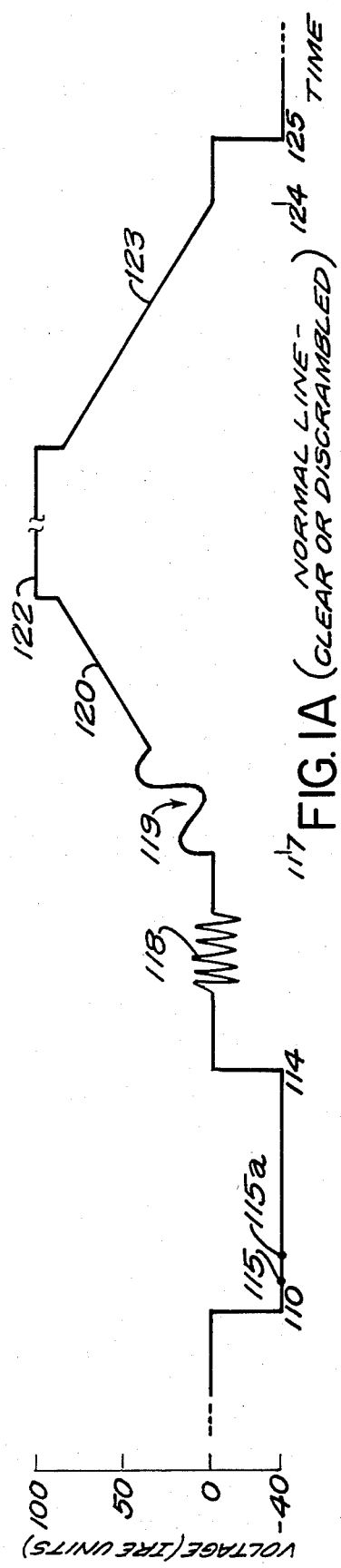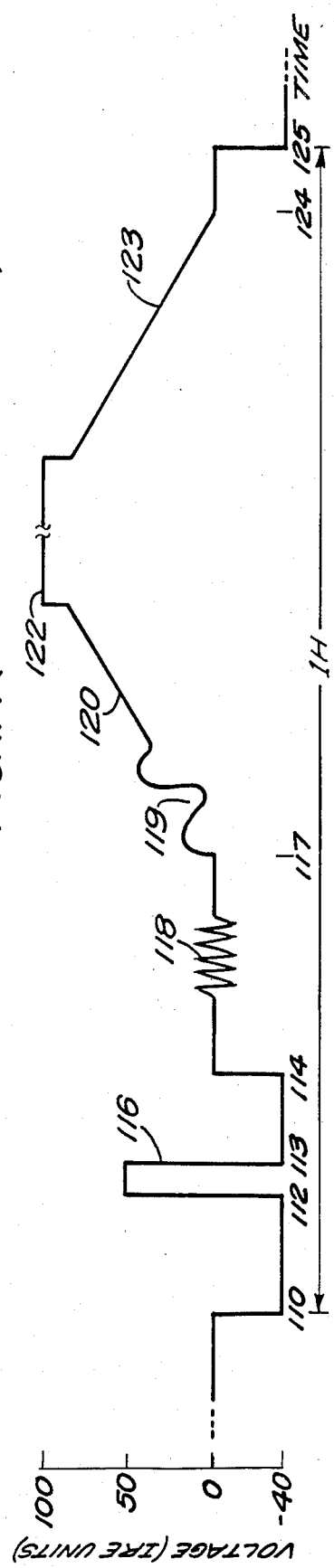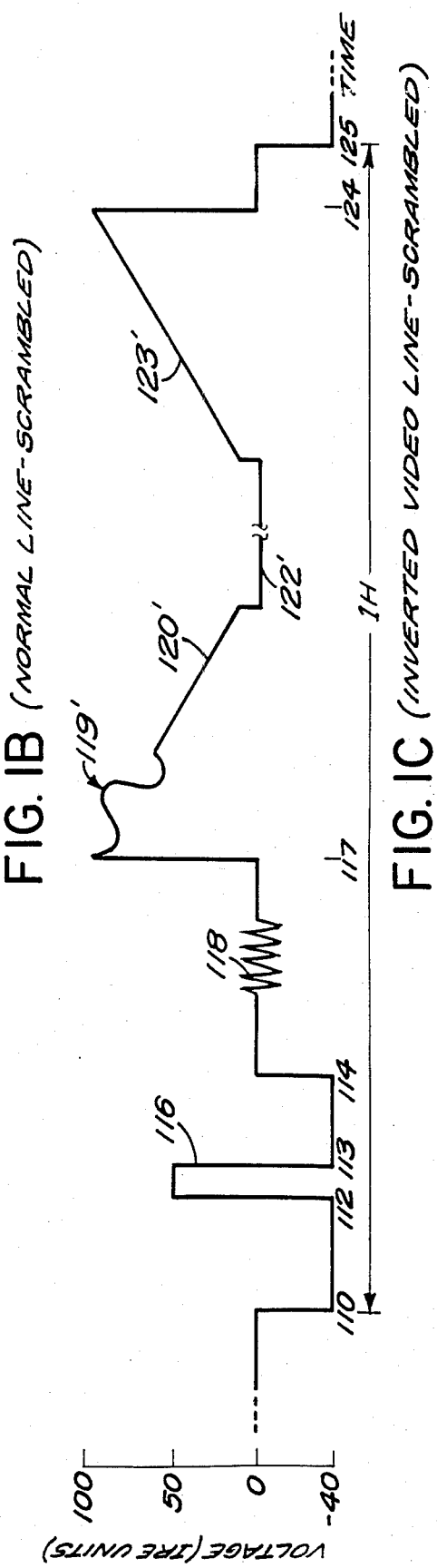

TELEVISION SIGNAL ENCRYPTION SYSTEM WITH PROTECTED AUDIO

DISCLOSURE OF THE INVENTION

This invention relates to video signal distribution systems and, more specifically, to television signal transmission/distribution systems characterized by signal security, permitting reception of scrambled television programming only by authorized recipients.

It is an object of the present invention to provide improved encrypted television signal distribution apparatus.

More specifically, it is an object of the present invention to provide a secure signal distribution system for restricting reception to encrypted (scrambled) premium television programming—as to subscribers in a pay television environment.

Yet another object of the present invention is the provision of an encrypted television signal distribution system which permits scrambling of audio only, or of the audio and video components of a television signal. Video only scrambling is disclosed and claimed in my co-pending, co-filed application Ser. No. 502,958, the disclosure of which is hereby incorporated herein by reference.

The above and other objects of the present invention are realized in a specific, illustrative encrypted video distribution system which includes a signal-originating head end for scrambling the audio portion of outgoing television program-bearing signals. In particular, the audio content of a television program assumes a relative polarity corresponding to the instantaneous binary value of a control digital wave produced by a keyed pseudo random generator. At each authorized subscriber location, a pseudo random generator is included in receiver descrambling circuitry and operates in a sequence identical to the like circuit at the head end to restore the polarity-inverted audio signal, thereby permitting reception and presentation of intelligible audio subject matter.

In accordance with another aspect of the present invention, the video information present during selected lines is inverted about predetermined inversion level and restored at equipped, authorized subscriber stations also under control of the pseudo random generators.

The above and other features and advantages of the present invention will become more clear from the following detailed description of a specific, illustrative embodiment thereof presented hereinbelow in conjunction with the accompanying drawings in which:

FIG. 1A is a wave form showing one television signal line at base band in conventional format;

FIG. 1B is a wave form depicting a line of video bearing the same intelligence of the FIG. 1A wave on a non-inverted basis in accordance with the principles of the present invention;

FIG. 1C is a wave form depicting an inverted line of video utilizing the principles of the present invention;

Figure 2A:
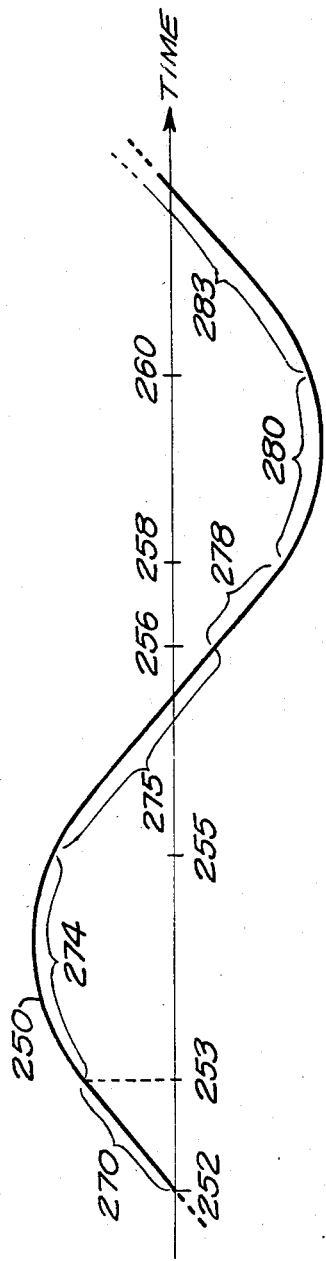
FIG. 2A is a wave form depicting an illustrative passage in the audio program constituent of a composite television program.

Referring now to FIG. 1A, there is shown an illustrative line of video information which may typically be included as one of a sequence of lines in a video field. The line begins with a horizontal synchronizing pulse which occurs during the period 110–114. The horizontal synchronization level is the lowest amplitude voltage point during the line. By NTSC standard or convention, horizontal sync may be expressed as −40 IRE units, where the signal level varies from the −40 amplitude during the synchronizing intervals to a maximum of +100 IRE units (corresponding to an extreme white picture content). Following the end of the horizontal sync pulse at time 114 (so-called horizontal sync back porch), a burst of color subcarrier 118 is present (at color burst frequency 3.58 mHz). There follows during interval 117–125 an arbitrary pattern of video information—in the case illustrated 1½ cycles of a sinusoid 119 superimposed upon a dark to bright internal ramp 120 peaking at white level 122 finally terminating in a linear bright to dark transition 123. The video content of each line will of course vary in actual practice in accordance with the particular image portion being represented.

In accordance with the principles of the present invention below discussed, video encryption is effected by selectively inverting the video information about a level intermediate the black level (0 IRE) and the bright level peak (+100 IRE), e.g., about +50 IRE. Again, for purposes below discussed a pulse 116 is included in the horizontal synchronization interval having an amplitude corresponding to the DC inversion level (assumed for illustrative purposes only to be +50 IRE as above noted).

FIG. 1B depicts a line of video information where the video has not been inverted and thus the information content of the line following color burst 118 identically corresponds to that of the normal or conventional line depicted in FIG. 1A. The FIG. 1B line of the instant invention differs from the normal line only by including the inversion level pulse 116 during the horizontal synchronization interval 110–114, as between the times 112 and 113.

FIG. 1C illustrates a video line corresponding to the normal or clear line of FIG. 1A—but where video information has been inverted about the +50 IRE. The inverted line is the same as the non-inverted line through the horizontal interval including the horizontal pulse back porch (video information period 117–125), bearing the color burst sinusoid 118. However, following the horizontal pulse back porch (video information period 117–125), all of the video information is inverted about the +50 level. For example, the beginning of the video information (the inception of sinusoid 119) begins at the +100 white level rather than at the 0 black level of FIG. 1B. Some reflection will show that the shape and levels of the remainder of the video wave represent the mirror image of the clear or normal video reflected about the +50-opted inversion level. Corresponding video signal portions are indicated in FIG. 1C with the same reference numerals as employed in FIGS. 1A or 1B but bear a primed notation.

At a conventional receiver not equipped with decrypting apparatus, the video information content of each line will sometimes be inverted and sometimes not. Accordingly, visual impact of such a received transmission as integrated by the eye over several frame traces will be a totally obviated image. Indeed, the image on an integrated basis throughout the picture will appear as a flat field of +50 IRE intensity.

This reception-inhibition exists where no other encryption is employed. In accordance with one aspect of the instant invention, however, the inverted/non-inverted wave above described may be subject to sync interval amplitude suppression as is per se well known to further inhibit signal reception by unauthorized equipment. Of course where such sync suppression is employed, receiver apparatus is furnished with the per se well known equipment to recover synchronizing information and to effect the inverse of the sync interval amplitude reduction effected at the signal originating head end or transmitter.

Many ways will be apparent to those skilled in the art to communicate line inversion information to system receivers such that inverted lines, and only inverted lines, will be reinverted and thus restored to proper format. Such inversion may be done on a predetermined basis—as by simply counting lines in a field. In accordance with a further aspect of the present invention which will become more clear from the following, however, identically sequencing pseudo random generators are employed at both the signal encrypting and decrypting locations to control the line video inverting/non-inverting pattern to increase video security.

The foregoing discussion has focused upon video scrambling in accordance with the instant invention. Audio scrambling will now be discussed in overview—principally with respect to FIGS. 2A–2D. FIG. 2A is a wave form depicting an assumed illustrative passage 250 in an audio program portion of a composite television program, e.g., a sinusoid. As will become more clear from the discussion below, the wave 250 of FIG. 2A is encrypted, or protected by selectively varying its polarity in accordance with an encrypting control signal. One assumed encoding pattern is shown by the rectangular wave of FIG. 2B of arbitrary form, where the lower, abscissa level represents non-inversion and where the relatively higher level connotes a polarity inversion for the audio program. The wave form of FIG. 2B can be generated in many ways well known to those skilled in the art—e.g., on a predetermined basis in accordance with an inverting clock or oscillator. More secure audio scrambling is effected, however, by employing a much less predictable wave—e.g., as generated by a pseudo random generator as set forth below.

Figure 2B:
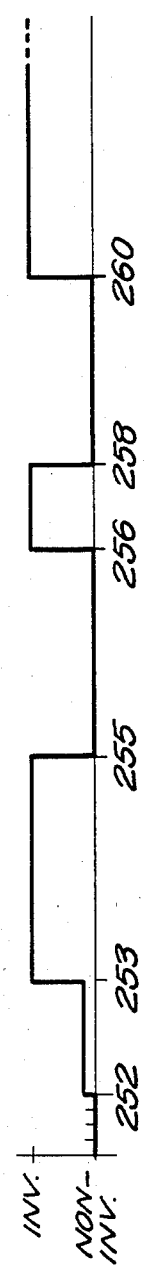
FIG. 2B is a timing diagram for an illustrative inversion/non-inversion control signal for audio encryption.
Figure 2C:
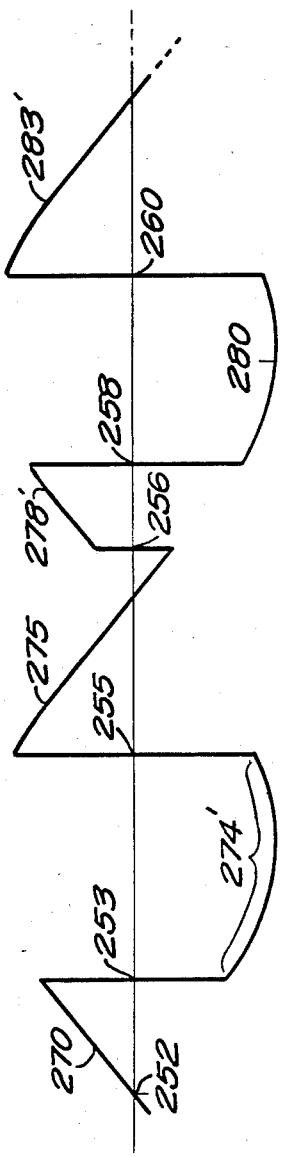
FIG. 2C depicts the scrambled or encrypted representation of the FIG. 2A audio passage in accordance with the instant invention.
Figure 2D:
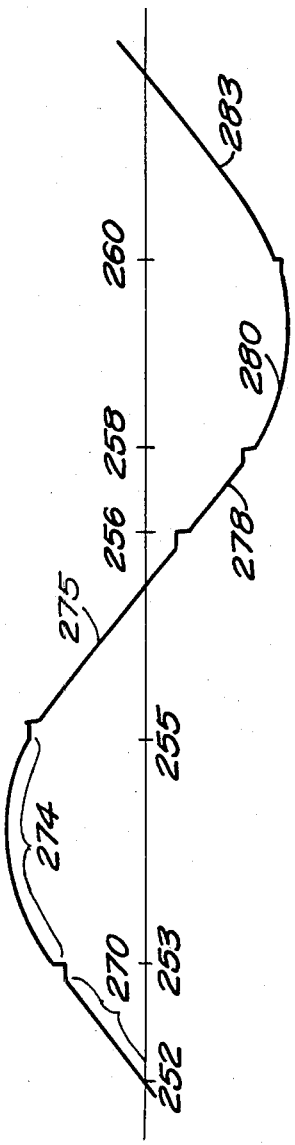
FIG. 2D is a wave form depicting the descrambled, restored audio wave.

The encrypted, outgoing audio wave of the instant invention is shown in FIG. 2C. FIG. 2C comprises a replica of the FIG. 2A wave during those periods when the inversion signal of FIG. 2B is low; and comprises a polarity inverted version for the clear or non-scrambled audio wave of FIG. 2A during those time intervals when the polarity inversion controlling signal of FIG. 2B is high. Corresponding reference numerals identify corresponding audio wave form portions in each of FIGS. 2A, 2C and 2D, with inverted signal components of FIG. 2C bearing a primed designation. Thus, for example, the initial part 270 of the wave 250 is identical in FIGS. 2A and 2C since the inversion-controlling wave form of FIG. 2B is low at its non-inverting level during the time interval 252–253. Conversely, during the time interval 253–255, the encrypted wave form component 274' is of like shape but opposite polarity vis-a-vis the clear or non-scrambled comparable portion 274 since the inverting wave of FIG. 2B is high during this period. The remainder of the wave of FIGS. 2A and 2C bears a corresponding relationship determined by the arbitrary inversion wave form invoked as typified by FIG. 2B. While five inversion/non-inversion transitions are illustrated in FIGS. 2A–2D for the one sinusoid cycle considered, the control wave of FIG. 2B can in general effect many more such transitions if desired. The transmitted wave form of FIG. 2C represents non-intelligible audio information and cannot be recovered or presented by a conventional television receiver when the audio intelligence shown is frequency demodulated from the television signal sound carrier. At authorized equipped subscriber locations who are to receive the audio portion of the composite television program, all those portions of the audio program which have been inverted (e.g., those portions 274', 278' and 283' of FIG. 2C) are reinverted under control of a wave form generated at the subscriber location which replicates the FIG. 2B inverting wave form employed at the transmitter or head end. The reconstituted wave form is shown in FIG. 2D. The recovered FIG. 2D wave form is substantially identical to the original audio intelligence of FIG. 2A and thus is fully recoverable and gives rise to the proper audio at a standard television receiver. As will be more clear from the following, transient suppression is effected at each of the switching points by maintaining the output constant at the pre-transition value shown, for example, by the short duration fixed audio level 272 which obtains between non-inverted audio signal portion 270 and restored, reinverted portion 274 in FIG. 2C. This constant signal level of short duration is implemented by a sample and hold circuit 165 (FIG. 4) below discussed, and obviates the sharp switching transients which might otherwise cause electrical damage and audio distortion unless ameliorated.

The above-described mode of audio scrambling may be employed alone where a television signal premium program provider deems audio signal suppression sufficient premium signal protection. Alternatively, the audio and video encryption herein discussed may be jointly effected to provide a higher level of signal security. Video encryption alone forms the subject of my above-discussed co-pending application and is not considered further herein.

Figure 3:
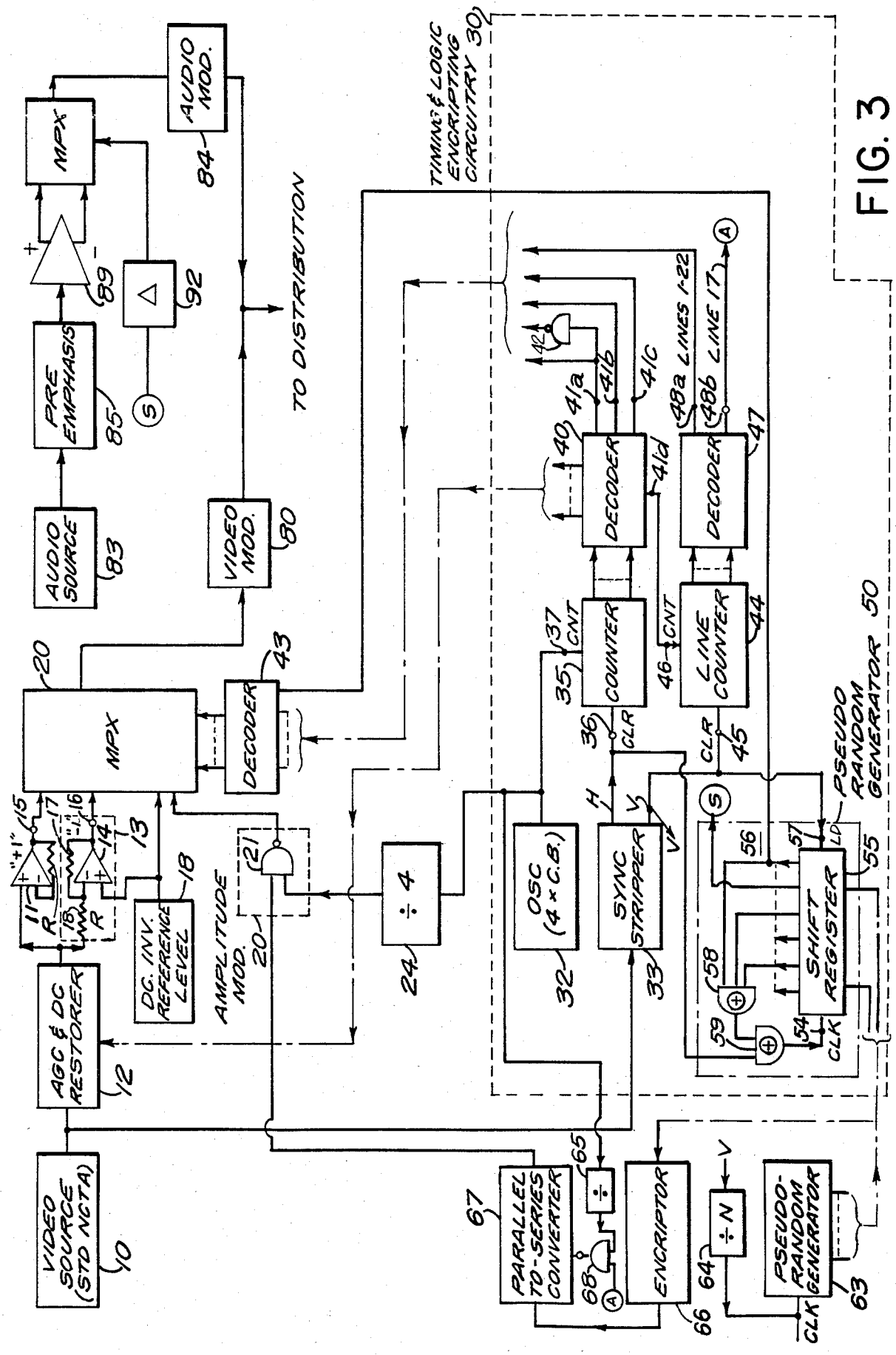
FIG. 3 is a block diagram illustrating signal encoding (scrambling) head end or transmitting station apparatus.

With the above overview of system functioning in mind, attention will now be directed to FIG. 3 which discloses video encrypting (selective line inverting) apparatus to effect the mode of encrypting above-described with respect to FIGS. 1A–1C. A video source 10 supplies video information in conventional (standard NTSC) format to an automatic gain control and D.C. restore circuit 12, and to a sync stripper 33. The video source 10 may comprise any base band video source well known to those skilled in the art, e.g., a video camera, tape recorder, microwave or satellite transmission demodulated to base band, or the like. The AGC and DC restorer 12 is not absolutely necessary—but is per se well known circuitry typically utilized to provide video signal clean up and assurance that voltage levels are of transmission accuracy and quality if not already of such fidelity.

The video information is supplied to a unity ("+1") gain amplifier 11 which provides non-inverted video (i.e., the conventional NTSC signal of FIG. 1A) at an output port 15. The video signal is also supplied to a unity gain inverting ("−1") amplifier 13 which provides inverted video at an output port 16 (e.g., provides the video portion of FIG. 1C during the 117-125 interval). A DC inversion reference level source 18 (the assumed DC level +50 IRE) is supplied as a second input to the inverting amplifier 13. Many forms of amplifiers to effect the above will be readily apparent to those skilled in the art—for example the per se well known operational amplifier configurations depicted. The unity gain amplifier 11 is employed to keep the relation phasings of the inverting and non-inverting transmission channels substantially equal.

The inverted and non-inverted video signals from amplifiers 11 and 14 are supplied as inputs to a multiplexer 20 as is the DC inverting reference level supplied by source 18. Further supplied to the multiplexer 20 is a signal at the color burst frequency (generated by dividing the frequency of an oscillator 32 which is at four times the color burst frequency by a factor of four in a divider 24). The color burst is amplitude modulated in a modulator 20 with a decripting shift key, as in a NAND logic gate 21, during some predetermined time, e.g., during line 17 which occurs during the vertical interval. The multiplexer 20 selects among its four inputs to supply to a video modulator 80 the desired signal components to construct the outgoing wave in accordance with the selection control effected by a decoder 43. Thus, for example, to construct the encoded but non-inverted line of FIG. 1B, the non-inverted output of amplifier port 15 is passed by multiplexer 20 to the video modulator 80 during the horizontal synchronizing pulse interval and color burst-bearing back porch (period 110-114) except for the time 112-113 when the multiplexer under control of the decoder passes the DC reference level from source 18 to the modulator 80. Because no inversion is to occur, the video signal from the non-inverting port 15 is coupled to modulator 80 during the video information interval 117-124. The inverted video line (e.g., FIG. 1C) is similarly constructed, except that the output of the inverting port 16 is selected by multiplexer 20 for delivery to video modulator 80 during the information content portion (114-125) of the video wave.

The sequence of successive video lines with inverted or non-inverted video content as appropriate are raised to the desired outgoing radio frequency by modulator 80 and impressed upon any distribution medium, e.g., an antenna for radiation or a cable for a CATV or MATV environment. Also generated for distribution is the audio content for the television program, supplied by an audio source 83 and further discussed below.

The remaining structure of FIG. 3 generates the control information for the multiplexer 20 and otherwise participates in the encoding process. Principally employed is a timing and logic circuit 30 which includes counters 35 and 44 and counter output state decoders 40 and 47 for subdividing an overall image period between vertical synchronizing pulses into predetermined time slots for effecting requisite functions required during the respective decoded time periods. The cascaded counters 35 and 44 and decoders 40 and 47 are per se well known to those skilled in the art and, indeed, are obtainable in integrated circuit form. Similarly, the use of cascaded counters and decoders to subdivide time under control of an input time base oscillator for signal subdivision and control is per se well known to those skilled in the art. All decoders of the instant invention may be combinatorial logic circuits or, alternatively, memories which store the desired decoding pattern.

The sync stripper 33 supplies a pulse each horizontal synchronizing interval ("H" output port) and a pulse during each vertical synchronizing interval ("V" output port). The horizontal sync pulses are supplied to a clear input 36 of counter 35 to clear or restart the counter decoder 35-40 from its initial state at the beginning of each line. The counter 35 is thereafter rapidly advanced at the multiple of the color burst rate as the oscillator 32 supplies pulses to the counting input 37 of counter 35. The outputs of counter 35 are supplied as inputs to the decoder 40 which provides pulses at a number of output ports to indicate the occurrence of various time intervals during each line as the counter 35 is monotonically advanced from its initially cleared state.

The line counter 44 is cleared at a clear input 45 by each vertical synchronizing pulse and is thereafter advanced at its count input port 46 as each video line is encountered (via output port 41d of the line subdivision decoder 40). Decoder 47 supplies output information indicating the incidence of particular lines within the interval between vertical synchronizing pulses for which certain system functions are required. The ensemble of outputs 48 from decoder 47 and 41a-41c from decoder 40 are supplied as inputs to the multiplexer 20-controlling decoder to control the multiplexer 20 as it generates the desired output information. More specifically, the decoder 40 supplies at output port 41a a signal indicating the occurrence of the horizontal pulse interval (time 110-114 in FIGS. 1A-1C). An inverter 42 is utilized to communicate to the decoder the inverse of the port 41a signal, i.e., that portion of a line other than the horizontal sync pulse. The decoder 40 supplies a signal at output port 42b indicating the occurrence of the time 112-113 during each line when the multiplexer 20 must select the DC inversion reference level (please see FIGS. 1B and 1C). The decoder 40 output port 41c communicates to multiplexer 20—controlling decoder 43 the interval when the color burst 118 is to be passed to the video modulator 80.

Continuing with the controlling inputs for the multiplexer 20, output port 48a of decoder 47 signals the incidence of lines (e.g., 1 through 22) of the vertical interval when no inversion is to occur. The remaining output 48b shown identifies line 17 so that a higher order decrypting key is modulated onto the color burst output of divider 24. Again, decoder 43 may be any combinatorial circuit for constraining the multiplexer 20 to pass the desired one of its four inputs to the video modulator 80 depending upon the Boolean values of the plurality of signals at its input control port.

In accordance with one aspect of the present invention, the line inversion/non-inversion process is governed by a pseudo random generator 50 which may be of any well known construction, e.g., a shift register 52 with selected stage outputs being coupled by exclusive OR logic 58 and 59 to the shift register clock input 54. Such a shift register/exclusive OR logic combination is a per se known structure for generating a unique, predetermined binary sequence. The pseudo random generator 50 is supplied at its preset input port 55 with a binary word by the output of a second pseudo random generator 63. At each vertical synchronizing interval the vertical sync pulse is applied to a preset load shift register port 53 such that the shift register 52 is initialized following each vertical retrace interval to a state governed by the output of the second pseudo random generator 63. Accordingly, the particular binary sequence emanating from the pseudo random generator 50—which corresponds to the video line inversion pattern, develops as the shift register 52 receives a clock input during each line following the vertical sync pulse and depends upon the output of the random generator 63. The generator 63 thus changes the line inversion/non-inversion pattern and controls encoding and decoding of the system. Accordingly, subscribers with illicit FIG. 4 receiver equipment, but who do not have access to the ongoing changing pattern of the pseudo random generator 63, cannot receive encoded video. The pseudo random generator 63 is clocked (and thus changes the line inversion pattern) by dividing down vertical synchronizing pulses such that the random generator encrypting pattern changes every few fields or the like. Other strategies as well may be employed to vary the output of generator 63. The pseudo random generator 63 may be implemented by any known construction, e.g., that shown in detail for the generator 50.

The output state of generator 63 is operationally passed through an encrypter 66 (e.g., a combinatorial or sequential logic circuit having a fixed or changeable encryption (signal varying) algorithm) which further scrambles the decrypting key, passes through a parallel-to-series converter 67 and is supplied as an input to the color burst modulating NAND gate 21. Clocking for the parallel-to-series converter (e.g., a shift register) is derived from the oscillator 32 via a divider 65 and a coincidence gate 68 enabled during the appropriate (e.g., line 17) time by output 48b of line decoder 47. Thus, the encrypting key needed for decripting at the subscriber terminal is communicated via amplitude modulation on the color burst subcarrier during the predetermined line 17 period.

Thus, the FIG. 3 scrambling/encoding apparatus selectively inverts the video information on a line by line basis in a pseudo random pattern with a hierarchy of encrypting keys generating a signal which cannot be recovered by a conventional television receiver—and, indeed, cannot be recovered by even apparatus of the instant invention without continuing access to the encryption pattern then invoked by the encrypter 66.

Figure 4:
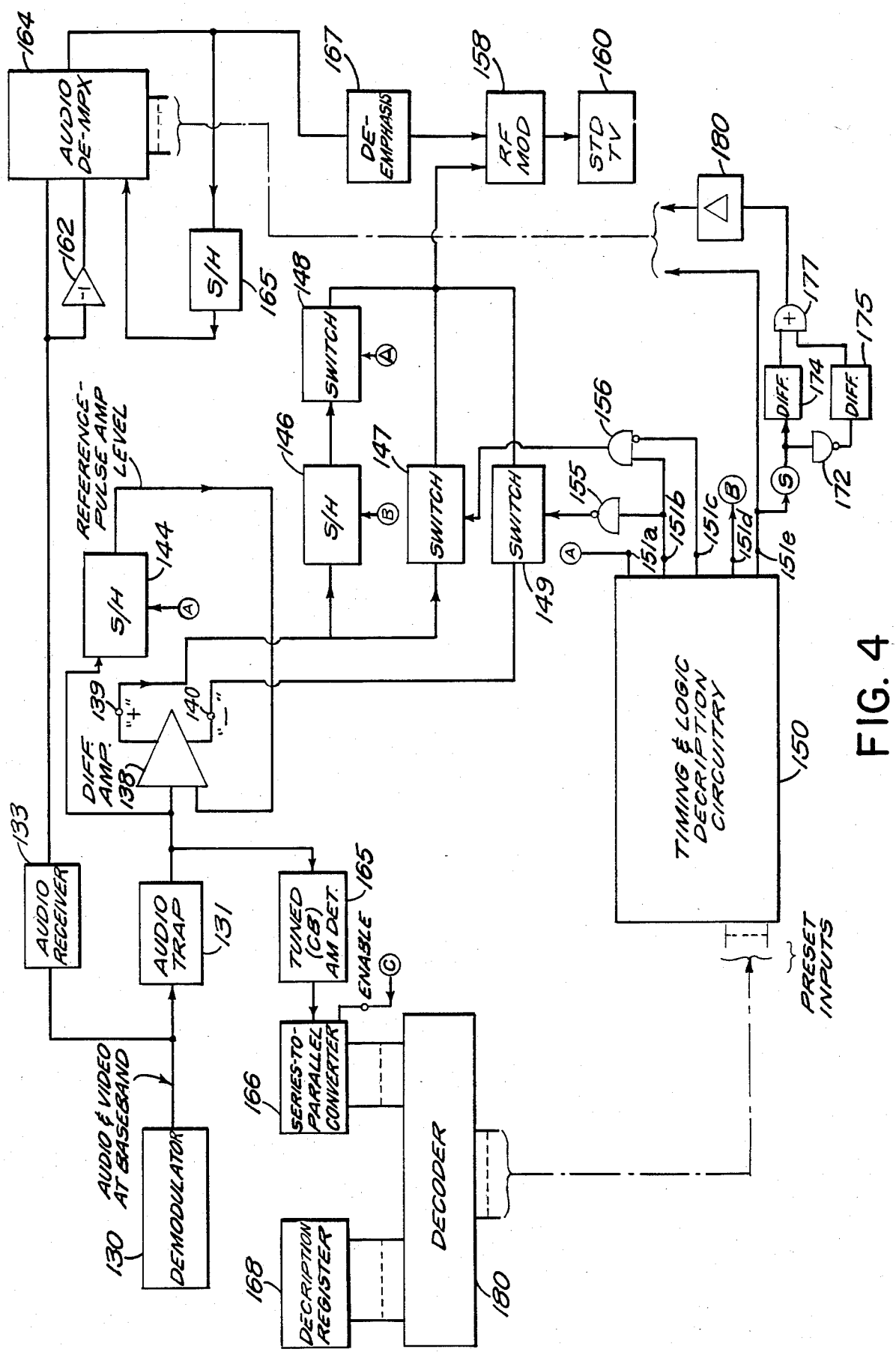
FIG. 4 is a block diagram schematically illustrating signal decrypting, receiver apparatus operable to recover transmissions encoded by the FIG. 2 structure.

Turning now to FIG. 4, there is shown receiving apparatus for receiving and reconstituting the television information image supplied by the video source 10 at the transmitter. A demodulator 130 recovers the incoming radio frequency wave and demodulates it to base band. A following audio trap 131 eliminates the sound subcarrier, with sound being detected by an audio receiver 133. The base band video (the inverted and non-inverted sequence of lines) is passed to one input of a difference amplifier 138. The amplifier 138 (one form of which is schematically shown in FIG. 4 and discussed below) generates at a non-inverting "+" output 139 the line as received. The amplifier 138 also generates and supplies the received line but having video information inverted around the nominal +50 IRE amplitude at an inverting, "−" output port 140.

Because the actual amplitude levels in the received wave may differ somewhat from the DC voltage levels when the encryption was actually generated, the inversion when required is made not about a fixed +50 IRE value but, rather, about the received amplitude of the inversion level pulse (116—FIGS. 1B and 1C) occurring during the associated horizontal sync interval. To this end, timing and logic decryption circuitry 150 directly analogous to the circuitry 30 at the head end (FIG. 3) generates an output signal at an output port 151a at times corresponding to the period 112-113 in FIGS. 1B and 1C. This timing pulse "A" activates a sample and hold circuit 144 to operate in a sampling mode during the interval such that the received level of the pulse 116 is stored for the remainder of the line at the output of the circuit 144 and is communicated to one input of the difference amplifier 138. Accordingly, video information at the inverting output port 140 is a measure of the difference between the received video and the received amplitude of the pulse 116 which undergoes proportional signal variance, if any, with the video intelligence and is not a strict difference vis-a-vis the absolute +50 IRE level to the extent that the received pulse amplitude in fact differs from that level. Accordingly, the signals at the amplifier 138 output ports 139 and 140 represent non-inverted and restored-reinverted outputs which reduce descrambling errors to very palatable, virtually indiscernable levels. The non-inverted and inverted video signals are supplied to video switches 147 and 149, respectively. The video switches may be implemented by any per se well known device, e.g., a controlled FET switch.

As was the case at the transmitter, timing and logic decryption circuitry 150 generates the necessary timing to permit system decription. The output at port 151b comprises the line-by-line invert/non-invert signal comparable to the output of pseudo random generator 50 as supplied to decoder 43 in FIG. 3 during the encoding process. An inverter 155 inverts the "non-inverted" output of port 151b to actuate the switch 149 when a line was in fact inverted at the transmitter/head end thus operatively selecting the reinverted output 140 for passage to an RF modulator 158. Correspondingly, the enabled "non-inverted"-signalling output at port 151b passes through an AND gate 156 to actuate switch 147 to select the non-inverted output of difference amplifier 138 port 139 when the line has not been inverted. The selected output of switch 147 or 149 becomes the operative video base band modulation corresponding to that obtaining at the original video source 10. This base band signal is passed to radio frequency modulator 158 to raise the frequency to a standard television channel and is then supplied to a standard television set 160 for viewing.

The timing circuitry output 151a is coupled to an inverting, AND 156 gate blocking input to block the non-invert signals during the period between times 112-113 to suppress the inversion level pulses 116 which do not form part of the conventional television signal and which are not to be passed to the modulator 158 or receiver 160. Further in this regard, a sample and hold circuit 146 is enabled by port 151c of timing logic 150 to sample the normal horizontal sync level, e.g., during the intervals 115-115a of FIG. 1A prior to the pulse 116. This level is then passed through switch 148 which is actuated during the pulse 116 interval 112-113 such that the RF modulator 158 receives the horizontal sync voltage (the actual level corresponding to the nominal −40 IRE value) during the interval 112-113. Accordingly, the descrambled video input to the RF modulator 158 identically correspond to the standard video signal of FIG. 1A which has been fully reconstituted. The RF modulator 158 is also supplied with the recovered, restored audio program as below discussed.

As above noted, the timing and logic decryption circuitry 150 essentially corresponds to the circuitry 30 of FIG. 2 and in particular employs a pseudo random generator identical to the generator 50 specifically shown in FIG. 2 and which operates in synchronization therewith to develop for receiver decryption the same inversion/non-inversion pattern as was used for encryption at the transmitter. To this end, the preset inputs 55 of the shift register 52 in circuitry 150 is supplied with the same digital pattern as existed at the output of pseudo random generator 63 at the head end. To effect this, an AM detector 161 tuned to the amplitude modulated color burst supplied by modulator 20 at the transmitter decodes the encrypting intelligence impressed on the color burst during line 17 at the transmitter. The output of AM detector 161 is converted from series-to-parallel form in a converter 166, enabled during line 17 via circuit 150 port 151d, with the converter output being supplied as inputs to a decoder 180. Also supplied to the decoder 180 is the remaining decryption key—required to effect the inverse of the encryption effected in encrypter 66 at the transmitter/head end, which is stored in a register 167. The register 167 may be a manually loaded memory (e.g., thumb wheel switches) or, preferably, may be loaded via any communications channel either in band or out of band. The decoder 180 operates on the Boolean inputs supplied thereto by the circuit elements 166 and 167 to generate the same preset signals as obtained at the output of pseudo random generator 63 at the transmitter. Again, decoder 180 may simply comprise combinatorial logic circuitry or a ROM or other memory.

Thus, the FIG. 4 arrangement employs timing circuitry 150 which generates at an output port 151b the same sequence of inversion/non-inversion signals as obtained at the output of transmitter pseudo random generator 50. This control signal is then used to select between the video information as received (non-inversion video at amplifier output 139) or to select the reinverted received signal (amplifier output 140) by actuating the appropriate switch 147 or 149. The reference inversion pulse 116 is suppressed after it has served its function at the receiver by blocking both switches 147 and 149 during the period 112–113 and employing the sample and hold circuit 146 and actuated switch 148 to replace the pulse with horizontal synchronizing pulse level voltage during that 112–113 interval.

Turning now to the audio scrambling and recovering portion of the transmitter/head end circuitry of FIG. 3, audio source 83 delivers the audio intelligence accompanying the video program above considered. The use of the audio source 83 may advantageously undergo well known pre-emphasis 85 to enhance higher frequency signals to improve the audio signals to noise ratio (and to also enhance the reception defeating performance of the instant invention by enhancing the effects of the alternately inverted signal passages). The pre-emphasized audio from network 85 is coupled to an amplifier 89 which provides at its two output ports non-inverted ("+") and inverted ("−") versions of the audio signal which are supplied as inputs to an audio multiplexer 90. The amplifier 89 may comprise a combination of the operational amplifier circuits 11 and 13 of FIG. 3. Many other single ended input, bipolar output amplifiers are per se well known to those skilled in the art.

The audio multiplexer 90 effects audio signal encryption by alternatively selecting the inverted or non-inverted outputs of amplifier 89 for passage to an audio modulator 84 and ultimately to the antenna, cable or other distribution network for delivery to all system receivers. Control of the multiplexer 90 is effected by the single control bit applied to a control port thereof via a delay circuit 92, delay being effected to permit signal sampling at system receivers for transient suppression prior to receiver polarity reversal. The polarity dedicating input "S" to delay 92 may comprise any binary wave which is capable of duplication at system receivers, e.g., communicated via an in band or out of band data channel (e.g., as sound carrier amplitude modulation), or which may be replicated without ambiguity at both the transmitter and receiver locations (e.g., as a pattern triggered by vertical sync), or the like. Specifically, a dedicated pseudo random generator for audio scrambling may be employed, for example, using circuitry comparable to the pseudo random generator 50 of FIG. 3.

In accordance with one aspect of the present invention, the pseudo random generator 50 may itself become the source of the audio scrambling wave (typified by FIG. 2B), thereby minimizing component count and expense, making multiple use of already existent circuit components. While the same random generator 50 output which controlled video line inversion may also be used for audio scrambling, it is deemed preferable to utilize a different signal to avoid coincident multiple switching of system sub-circuits. Accordingly, the sound scrambling controlling signal "S" is illustratively obtained as shown employing a shift register 52 output stage different from that utilized for video scrambling.

The above described FIG. 3 equipment operates in the manner above discussed with respect to FIGS. 2A–2D to effectively broadcast an audio program absolutely unrecoverable by a conventional television receiver. In brief summary and to review, multiplexer 90 under control of the binary level output "S" (comparable to FIG. 2B) selects either the non-inverted (unprimed) or polarity-reversed (primed) versions of the FIG. 2A intelligence at the output of amplifier 89 to generate the encrypted/scrambled wave form analogous to that of FIG. 2C. FIG. 2C becomes the base band modulation which frequency modulates the television audio subcarrier in modulator 84 for delivery to system subscribers. At subscriber television sets not equipped to receive the scrambled audio program of the instant invention, the sound frequency demodulator recovers the base band audio wave of FIG. 2C which simply becomes meaningless noise and certainly not the original audio information of FIG. 2A.

Referring now to FIG. 4, timing and logic decryption circuitry 150 includes a pseudo random generator operating in synchronization with the pseudo random generator 50 at the transmitter or head end of FIG. 3 as above discussed thereby producing at circuitry 150 output port 151e a replica of the audio encrypting/decrypting control signal "S" (analogous to the FIG. 2B wave). The wave form in non-inverted and inverted (via inverter 172) form is operated upon by differentiators 174 and 175, to produce pulses at each positive and negative going transition of the control (FIG. 2B) wave, respectively. These outputs then pass to an OR logic gate 177 which thus provides an output pulse each time a transition occurs. This output signal "R" (undelayed) controls the sample and hold circuit 165 which thus stores the last audio level obtaining prior to a transition (polarity inverting) time—such as the level 272 of FIG. 2D.

This level preservation is employed as above discussed to obviate audio transients which might otherwise occur during switching intervals. The inversion level "S" signal is delayed in a delay 180, and the transient interval period "R" is delayed and timed as in a delay and one shot multi-vibrator 182, with these signals becoming control (input port selection) inputs to an audio signal demultiplexer 164. Supplied as inputs to the audio demultiplexer 164 are non-inverted and inverted (by inverting amplifier 162) versions of the received audio modulation. No non-inverting amplifier is required for audio (compare use of amplifier 11 for video non-inverted transmission) since inverting amplifier phase delays are not meaningful vis-a-vis audio frequencies and also because of the preserved level operatively selected during transition periods.

The output of the demultiplexer 164 comprises the polarity-restored descrambled signal comparable to the wave shown in FIG. 2D. The restored audio passes to a de-emphasis network 168 to effect the inverse of the pre-emphasis effected by the pre-emphasis network 85 at the transmitter or head end. The output of the de-emphasis network 158 is furnished along with the video output of switches 146, 147 and 149 to a radio frequency modulator 158 which raises the descrambled video and sound in standard format to that of a standard television channel where each may be recovered and presented by conventional operation of the standard television receiver 160.

The audio demultiplexer 164 responds to the control signals supplied thereto by connecting the non-inverted, clear audio at its upper input to its output terminal when the control signal "S" via delay 180 (which basically equates to delay 92 at the head end) signals a non-inverting mode. Correspondingly, when the output of delay 180 signals that an inversion has taken place, demultiplexer 164 operatively selects and connects the output of inverting amplifier 162 to its output thus effecting signal reinversion and restoration. When the output of delay and monostable multi-vibrator 182 signals an inversion/non-inversion transition or vice versa, the fixed output of sample and hold circuit 165 is operatively selected for transient elimination purposes above discussed. As earlier noted, sample and hold circuit 165 is briefly actuated into its sample mode in advance of the output of delay 182 via the "R" output, delay 182 thus being employed to obviate a race condition.

The audio encrypting/decrypting circuitry of FIGS. 3 and 4 thus suitably protects the audio component of a composite television program rendering the audio as disseminated useless absent the selective audio signal polarity reversing apparatus of the FIG. 4 receiver.

Figure 5:
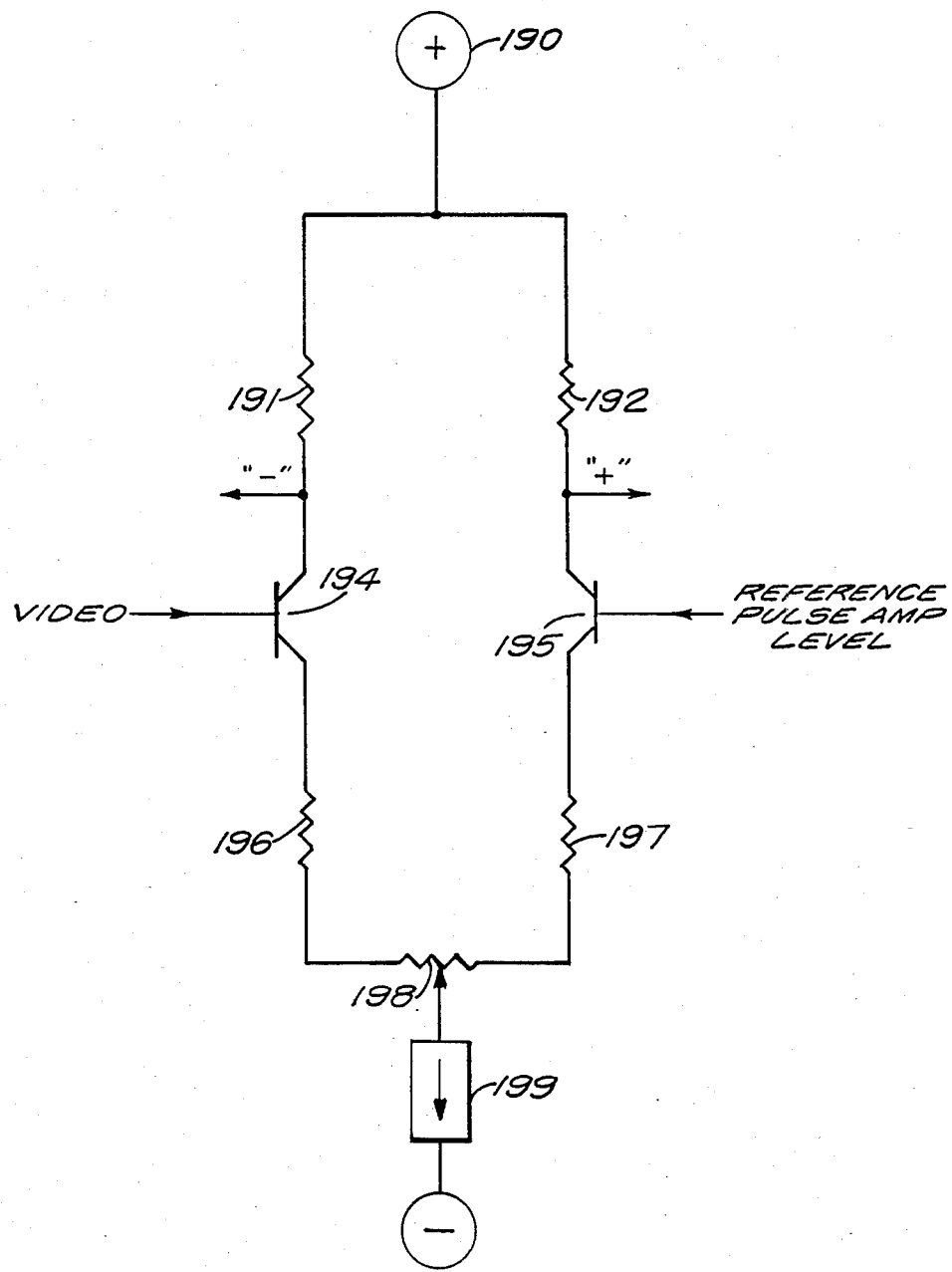
FIG. 5 is a schematic diagram illustrating a favored form of difference amplifier for the instant invention.

Finally, FIG. 5 shows a particularly advantageous implementation of difference amplifier structure usable for the amplifier 138 (FIG. 4) of the instant invention. The circuit employs transistors 194 and 195 having resistors 196, 198 and 197 connected between their emitters, and equal collector circuit resistors 191 and 192. The resistor 198 is a potentiometer having its center tap connected to a negative voltage via a current source 199, e.g., a transistor having a fixed base voltage and a series emitter resistor. The video information is supplied to the base of one transistor, e.g., the device 194, while the reference inversion voltage is supplied to the base of the other transistor. The non-inverting voltage is taken at the collector of the transistor (195) having its base driven between inversion DC level, while the inverted level is taken from the transistor having its base supplied with the line video information. By matching values for the resistors 191 and 192 and assuming the transistors have a very substantial gain, the gain of the amplifier for both inverting and non-inverting outputs is essentially given by the quotient of the collector resistance divided by the sum of the emitter-to-emitter three series resistors 196–198. Moreover, the two outputs are 180° out of phase, and both the gain and the phase criteria obtain over a wide frequency range from DC through the video range. The matched gain and phase for the reinverting and non-inverting signal paths of the instant invention, and communication path linearity, are important since a signal undergoing inversion at the head end and reinverted restoration at the receiver must be substantially equal to its sometimes non-inverted replica to avoid image distortion.

In summary then the apparatus of the instant invention provides a secure system for transmitting audio and video information which may be receivable only by subscribers having equipment to duplicate the level/polarity inversion/non-inversion encrypting pattern, and which contain structure responsive to the inverted/non-inverted control mandates to selectively restore received intelligence to a format viewable by a standard television receiver.

The above-described arrangement is merely illustrative of the principles of the present invention. Numerous modifications and adaptations thereof will be readily apparent to those skilled in the art without departing from the spirit and scope of the present invention.

What is claimed is:

1. In combination in a system for communicating a television program which includes encrypted audio and video signals; signal originating means including a first pseudo random generator for generating an audio scrambling control signal, means for generating polarity inverted and non-inverted versions of the television audio signal, and selection means controlled by said first controlling means for operatively selecting for communication the polarity inverted or the non-inverted version of the television audio signal; and receier means including means for receiving the signal supplied by said selection means, said receiver means including a second pseudo random generator for generating a replica of said udio scrambling control signal, means for generating polarity inverted and non-inverted versions of the signal received by said receiving means, and additional selection means controlled by said second controlling means for operatively selecting for listening said inverted or non-inverted version of said received audio signal, whereby the output of said additional selection means comprises polarity restored audio, said signal originating means further including selective inversion means for selectively inverting the video information content of video lines about an inversion reference level and for not inverting the video information content of other lines, signal distribution means for distributing the output signal produced by said selective video inversion means, and means for distributing a measure of said inversion reference level with the composite signal distributed by said signal distribution means; and wherein said receiver means further includes means for receiving said composite signal from said signal distribution means; said decrypting means including inversion reference means for recovering the received video inversion reference level, and means for selectively reinverting the video information content of inverted video lines about the recovered inversion reference of said inversion reference means.

2. A combination as in claim 1, wherein said selection means comprises a multiplexer, and wherein said additional selection means comprises a demultiplexer.

3. A combination as in claim 1, further comprising storage means for storing the output of said additional selection means, an output of said storage means being connected to said additional selection means, and means connected to and responsive to said second controlling means signalling a transition in said audio scrambling control signal for controlling said additional selection means to operatively select for a period of time the contents of said storage means.

4. A combination as in claim 1, wherein said inversion reference distributing means includes means for inserting a pulse having an amplitude descriptive of said inversion reference level into the video line horizontal synchronizing pulse intervals.

5. A combination as in claim 4, wherein said signal originating encrypting means further comprises first binary sequence generating means for controlling said selective inversion means; and wherein said signal recovering means decrypting means includes second binary sequence means for controlling said selective reinverting means, and means constraining said second binary sequence means to supply a sequence corresponding to that generated by said first binary sequence generating means.

6. A combination as in claim 5, wherein said first and second binary sequence generator means respectively comprise first and second pseudo random generator means.

7. A combination as in claim 6, wherein said first psuedo random generator means includes a shift register having a clock input, plural outputs, exclusive OR logic means connecting selected of said outputs with said clock input, and plural preset input terminals, and further comprising third pseudo random generator means having plural outputs connected to said preset input terminals of said shift register.

8. A combination as in claim 6, further comprising control means for supplying an encryption key digital word controlling said first pseudo random generator means, and wherein said signal distribution means further comprises means for distributing the encryption key digital word supplied by said control means.

9. A combination as in claim 8, wherein said signal recovering decrypting means further includes means for receiving said distributed encryption key digital word for synchronizing said second binary sequence means with said first binary sequence means.

10. A combination as in claim 8, wherein said control means further comprising means for encrypting said encryption key digital word.

11. A combination as in claim 4, wherein said selective reinverting means includes means for generating received and inverted versions of the video information received by said decrypting means, and switch means for passing one or the other of said inverted or non-inverted received program versions therethrough.

12. A combination as in claim 11, wherein said decrypting means further comprise timing means for controlling said switch means.

* * * * *